(12) United States Patent
Katayama

(10) Patent No.: US 8,872,671 B2
(45) Date of Patent: Oct. 28, 2014

(54) APPARATUS OUTPUTTING SOUND IN SPECIFIED DIRECTION

(71) Applicant: DENSO CORPORATION, Kariya (JP)

(72) Inventor: Yuusuke Katayama, Toyota (JP)

(73) Assignee: DENSO CORPORATION, Kariya (JP)

( * ) Notice: Subject to any disclaimer, the term of this patent is extended or adjusted under 35 U.S.C. 154(b) by 32 days.

(21) Appl. No.: 13/741,555

(22) Filed: Jan. 15, 2013

(65) Prior Publication Data

US 2013/0187793 A1 Jul. 25, 2013

(30) Foreign Application Priority Data

Jan. 19, 2012 (JP) .................................. 2012-009019

(51) Int. Cl.
*G08G 1/09* (2006.01)
*G08G 1/16* (2006.01)
*B60Q 9/00* (2006.01)
*G08G 1/0967* (2006.01)
*G08G 1/0962* (2006.01)

(52) U.S. Cl.
CPC .............. *G08G 1/0967* (2013.01); *G08G 1/167* (2013.01); *B60Q 9/00* (2013.01); *G08G 1/09626* (2013.01); *G08G 1/09623* (2013.01)
USPC ......................... 340/905; 340/691.6; 340/7.57

(58) Field of Classification Search
USPC ......... 340/905, 901–904, 446, 460, 463, 468, 340/472, 474, 692, 691.6, 825.24–825.25, 340/7.57, 286.11, 815.46, 815.79
See application file for complete search history.

(56) References Cited

U.S. PATENT DOCUMENTS

| | | | | |
|---|---|---|---|---|
| 2005/0162513 | A1* | 7/2005 | Chan ............................. | 348/118 |
| 2006/0077543 | A1* | 4/2006 | Miyoshi et al. ............... | 359/407 |
| 2006/0273855 | A1* | 12/2006 | Matsui et al. ................. | 330/185 |
| 2008/0025518 | A1* | 1/2008 | Mizuno et al. ................. | 381/17 |
| 2009/0027399 | A1* | 1/2009 | Sato et al. ..................... | 345/467 |
| 2013/0188794 | A1 | 7/2013 | Kawamata | |

FOREIGN PATENT DOCUMENTS

| | | |
|---|---|---|
| JP | 07-159190 A | 6/1995 |
| JP | 2005-316704 A | 11/2005 |
| JP | 2008-35472 A | 2/2008 |
| JP | 2009-251799 A | 10/2009 |

OTHER PUBLICATIONS

Office Action mailed Jan. 7, 2014 in the corresponding JP application No. 2012-009019 (English Translation).

* cited by examiner

*Primary Examiner* — Daniel Previl
(74) *Attorney, Agent, or Firm* — Posz Law Group, PLC

(57) ABSTRACT

A sound output apparatus for a vehicle includes a sound input device, a sound signal generation section, a sound output device, a road-information acquisition section, and a specified-direction determination section. The sound input device collects sounds outside of the vehicle. The sound signal generation section generates an output signal based on the sounds outside of the vehicle collected. The sound output device outputs a sound to a vehicle interior of the vehicle based on the output signal generated. The road-information acquisition section acquires road information in proximity of the vehicle. The specified-direction determination section determines a specified direction which is previously associated with the road information. The sound signal generation section generates the output signal such that a direction of sound-image localization of a sound outputted by the sound output device accords with the specified direction determined by the specified-direction determination section.

13 Claims, 11 Drawing Sheets

FIG. 7

| | SHAPE OF ROAD AHEAD | NO. OF LANES | TRAVEL LANE | TARGET SETUP INFO ($\theta_{tgt}$, $\delta_{tgt}$) |
|---|---|---|---|---|
| (1) | STRAIGHT | 1 | – | (225, 90) |
| (2) | – | 2 | 1ST | (135, 135) |
| (3) | – | – | 2ND | (225, 135) |
| (4) | +/T INTERSECT | 1 | – | (45, 45), (335, 45), (225, 90) |
| (5) | – | 2 | 1ST | (335, 45), (225, 90) |
| (6) | – | – | 2ND | (45, 45) |
| (7) | MERGE | 1 | MERGED | (135, 90) |
| (8) | – | – | USUAL | (225, 135) |
| ... | ... | ... | ... | ... |

APPARATUS OUTPUTTING SOUND IN SPECIFIED DIRECTION

CROSS REFERENCE TO RELATED APPLICATION

The present application is based on Japanese Patent Application No. 2012-9019 filed on Jan. 19, 2012, the disclosure of which is incorporated herein by reference.

TECHNICAL FIELD

The present disclosure relates to a sound output apparatus.

BACKGROUND

[Patent Literature 1] JP 2005-316704 A

An in-vehicle system in a host vehicle is proposed to collect sounds outside of the host vehicle arriving from peripheral directions using microphones and reproduce sounds using speakers inside of the host vehicle as if arriving from the peripheral directions, in order to warn the driver of objects or events existing around the host vehicle; the objects or events include other vehicles including overtaking vehicles, pedestrians, and bicycles, for instance. For example, Patent Literature 1 describes a technology to determine a caution-needed direction, which the driver of a vehicle needs to pay attention to, based on behavior states such as the direction of the face of the driver, or operation states such as the state of the blinker of the vehicle, and then present peripheral sounds from the caution-needed direction with emphasis toward a vehicle interior of the vehicle.

However, the technology in Patent Literature 1 does not consider states outside the vehicle when determining the caution-needed direction; thus, the driver may not pay attention to the direction to which the driver needs to pay attention essentially.

SUMMARY

It is an object of the present disclosure to provide a sound output apparatus for a vehicle to consider peripheral states outside of a vehicle.

To achieve the above object, according to an example of the present disclosure, a sound output apparatus for a vehicle is provided to include a sound input device, a sound signal generation section, a sound output device, a road-information acquisition section, and a specified-direction determination section. The sound input device collects sounds outside of the vehicle. The sound signal generation section generates an output signal based on the sounds outside of the vehicle collected by the sound input device. The sound output device outputs a sound to a vehicle interior of the vehicle based on the output signal generated by the sound signal generation section. The road-information acquisition section acquires road information in proximity of the vehicle. The specified-direction determination section determines a specified direction which is previously associated with the road information. The sound signal generation section generates the output signal such that a direction of sound-image localization of a sound outputted by the sound output device accords with the specified direction determined by the specified-direction determination section.

The sound outputted by the sound output device is heard by the user from the specified direction, which corresponds to the direction of sound image localization. This permits the user to pay attention to the specified direction to which the user needs to pay attention essentially. In addition, the user can understand the direction to which the user needs to pay attention or provide cautions.

BRIEF DESCRIPTION OF THE DRAWINGS

The above and other objects, features, and advantages of the present disclosure will become more apparent from the following detailed description made with reference to the accompanying drawings. In the drawings:

FIG. 7 is a diagram illustrating setup values of specified directions;

DETAILED DESCRIPTION

The following describes embodiments of the present disclosure with reference to drawings.

First Embodiment

1. Configuration of Sound Output Apparatus 1

Figure 1:
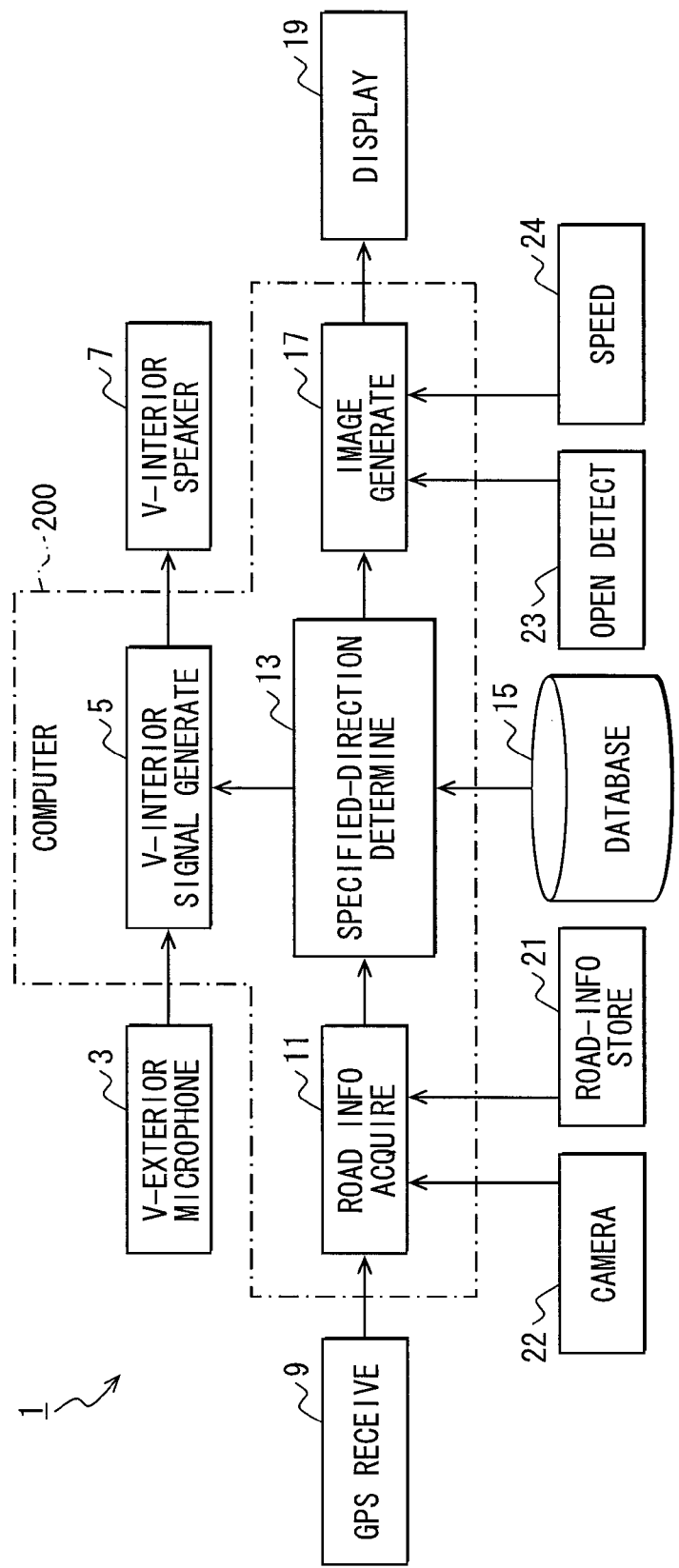
FIG. 1 is a block diagram illustrating a configuration of a sound output apparatus according to a first embodiment of the present disclosure.
Figure 2:
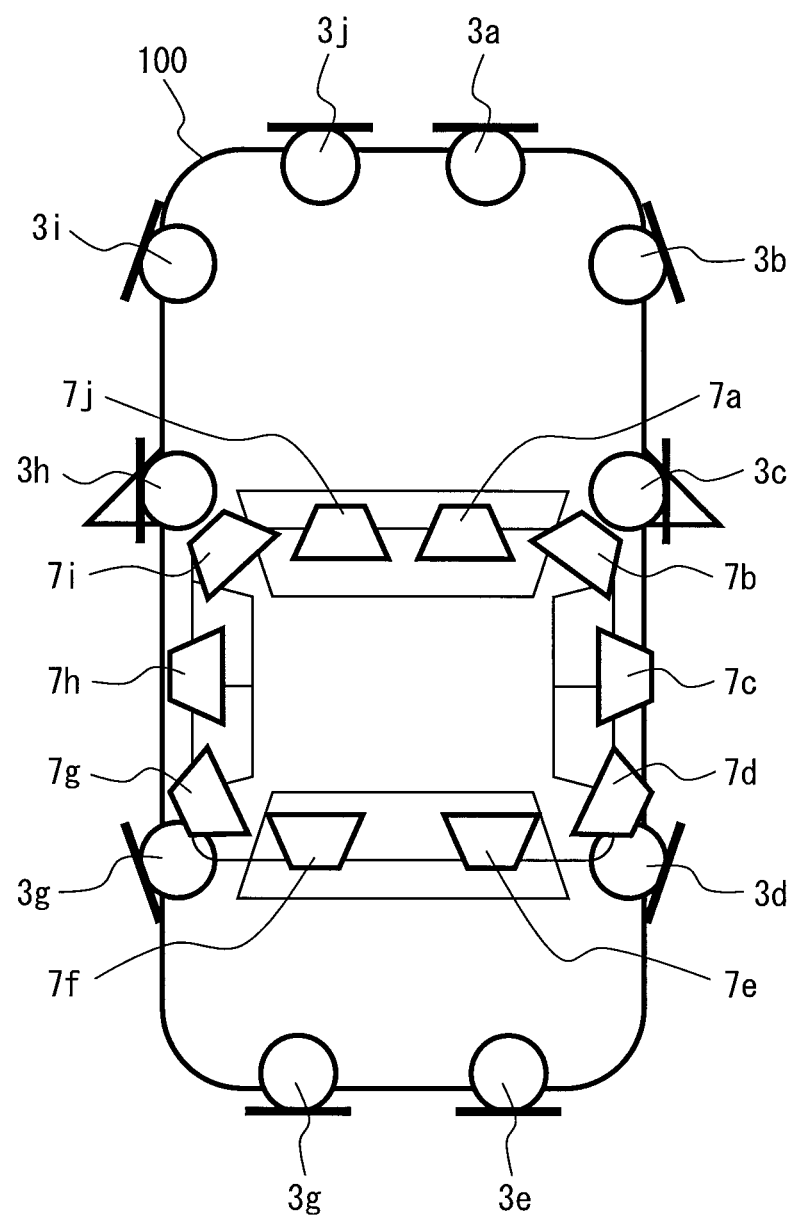
FIG. 2 is a plan view illustrating an arrangement of microphones outside of a vehicle and speakers inside of the vehicle.

With reference to FIGS. 1, 2, the following will explain a configuration of a sound output apparatus 1 in a vehicle 100. FIG. 1 is a block diagram illustrating a configuration of the sound output apparatus 1 according to the first embodiment. FIG. 2 is a plan view illustrating an arrangement of vehicle-exterior microphone device 3 and vehicle-interior speaker device 7 in the vehicle 100.

The sound output apparatus 1 include the following: a vehicle-exterior microphone device 3, which may be also referred to as a sound input device or means 3, or a sound collecting device or means 3, and which is a microphone device provided outside of the vehicle 100; a vehicle-interior output signal generation section 5, which may be also referred to as a sound signal generation section, device, or means 5; a vehicle-interior speaker device 7, which may be also referred to as a sound output device or means 7 and which is a speaker device provided inside of the vehicle 100; a GPS (Global Positioning System) receiver 9, which may be also referred to as a vehicle position acquisition device or means 9; a road-information acquisition section, device, or means 11; a specified-direction determination section, device, or means 13, which may be also referred to as an emphasis section, device, or means; a specified-direction setup reference database 15, which may be also referred to as a specified-direction setup storage device or means 15; an image generation section, device, or means 17; a display 19 which may be also referred to as a display device or means 19; and a road-information storage device or means 21 that stores road information.

Further, the vehicle-interior output signal generation section 5, the road-information acquisition section 11, the specified-direction determination section 13, and the image generation section 17 may be sections included in a computer 200. In other words, those sections 5, 11, 13, 17 may be achieved by a CPU of the computer 200 executing predetermined programs in a storage media such as ROM, RAM in the computer 200.

The microphone device 3 includes ten vehicle-exterior microphones 3a to 3j, which may be also referred to as sound input elements 3a to 3j, as indicated in FIG. 2. The vehicle-exterior microphones 3a to 3j are arranged along a peripheral line of the vehicle 100 so as to surround the vehicle 100. The vehicle-exterior microphones 3a to 3j each are directional (e.g., unidirectional). The vehicle-exterior microphones 3a to 3j each have a high sensitivity in an outward direction from the vehicle 100.

The vehicle-interior output signal generation section 5, the specified-direction determination section 13, the specified-direction setup reference database 15, and the image generation section 17 execute the processes mentioned later. The vehicle-interior speaker device 7 is provided in a vehicle compartment or vehicle interior of the vehicle 100 to output sounds towards a central portion of the vehicle interior. The vehicle-interior speaker device 7 includes ten vehicle-interior speakers 7a to 7j, which may be also referred to as sound output elements 7a to 7j, as indicated in FIG. 2. The vehicle-interior speaker 7a is disposed in almost the same direction as the direction in which the vehicle-exterior microphone 3a is disposed, when viewed from the driver of the vehicle 100. Similarly, the vehicle-interior speakers 7b to 7j are arranged in almost the same directions as the directions in which the vehicle-exterior microphones 3b to 3j are arranged, respectively, when viewed from the driver of the vehicle 100.

In addition, the vehicle-interior speakers 7a to 7j and the vehicle-exterior microphones 3a to 3j have one-to-one correspondence relation. That is, the vehicle-interior speaker 7a outputs only the sound that is based on the sound collected by the vehicle-exterior microphone 3a; the vehicle-interior speaker 7b outputs only the sound that is based on the sound collected by the vehicle-exterior microphone 3b; the vehicle-interior speaker 7c outputs only the sound that is based on the sound collected by the vehicle-exterior microphone 3c; the vehicle-interior speaker 7d outputs only the sound that is based on the sound collected by the vehicle-exterior microphone 3d; the vehicle-interior speaker 7e outputs only the sound that is based on the sound collected by the vehicle-exterior microphone 3e; the vehicle-interior speaker 7f outputs only the sound that is based on the sound collected by the vehicle-exterior microphone 3f; the vehicle-interior speaker 7g outputs only the sound that is based on the sound collected by the vehicle-exterior microphone 3g; the vehicle-interior speaker 7h outputs only the sound that is based on the sound collected by the vehicle-exterior microphone 3h; the vehicle-interior speaker 7i outputs only the sound that is based on the sound collected by the vehicle-exterior microphone 3i; and the vehicle-interior speaker 7j outputs only the sound that is based on the sound collected by the vehicle-exterior microphone 3j.

The GPS receiver 9 acquires a present position of the vehicle 100. The road information acquisition section 11 acquires road information of a proximity of the present position of the vehicle 100 acquired by the GPS receiver 9, in particular, road information of the heading direction of the vehicle 100, from the road-information storage device 31. The road-information storage device 21 stores a road database which stores road information. The road information includes a branch state of roads, the number of lanes, presence or absence of a merging lane, presence or absence of a crosswalk, presence or absence of a stop sign, presence or absence of a side walk, presence or absence of a median strip, presence or absence of a traffic signal, presence or absence of a railway, residential area or not, speed limit information, and road sign information.

The display 19 is provided in the vehicle interior of the vehicle 100 to be visible and audible from the driver.

2. Process by Sound Output Apparatus 1

The following will explain a process executed by the sound output apparatus 1 with reference to FIG. 3 to FIG. 12. Further, as explained above, the sound output apparatus 1 may include the computer 200; this computer 200 can execute the processes of the following flowcharts by executing predetermined programs stored in the ROM of the computer 200, for instance.

It is further noted that a flowchart in the present application includes sections (also referred to as steps), which are represented, for instance, as S10. Further, each section can be divided into several sections while several sections can be combined into a single section. Furthermore, each of thus configured sections can be referred to as a module, device, or means and achieved not only (i) as a software section in combination with a hardware unit (e.g., computer 200), but also (ii) as a hardware section, including or not including a function of a related apparatus. Further, the hardware section may be inside of a microcomputer.

Figure 3:
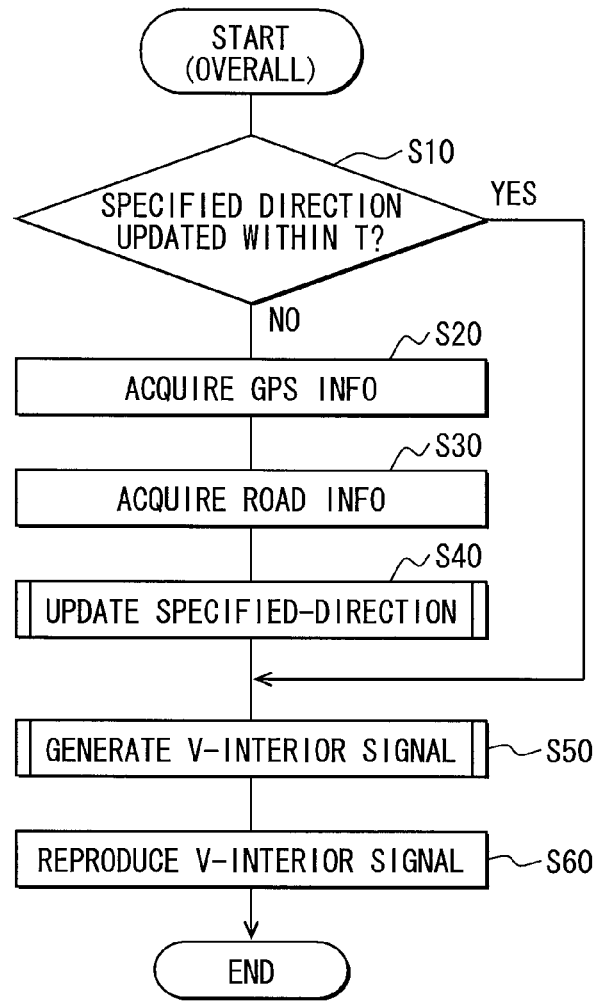
FIG. 3 is a flowchart diagram illustrating an overall process in the sound output apparatus.
Figure 4:
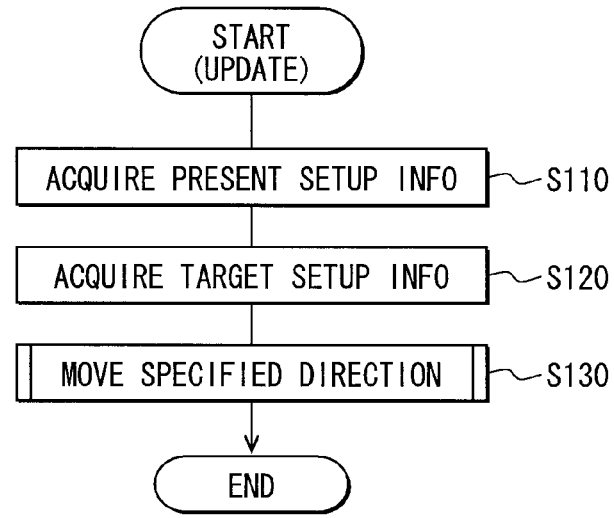
FIG. 4 is a flowchart diagram illustrating an update process for updating a specified direction in the sound output apparatus.
Figure 5:
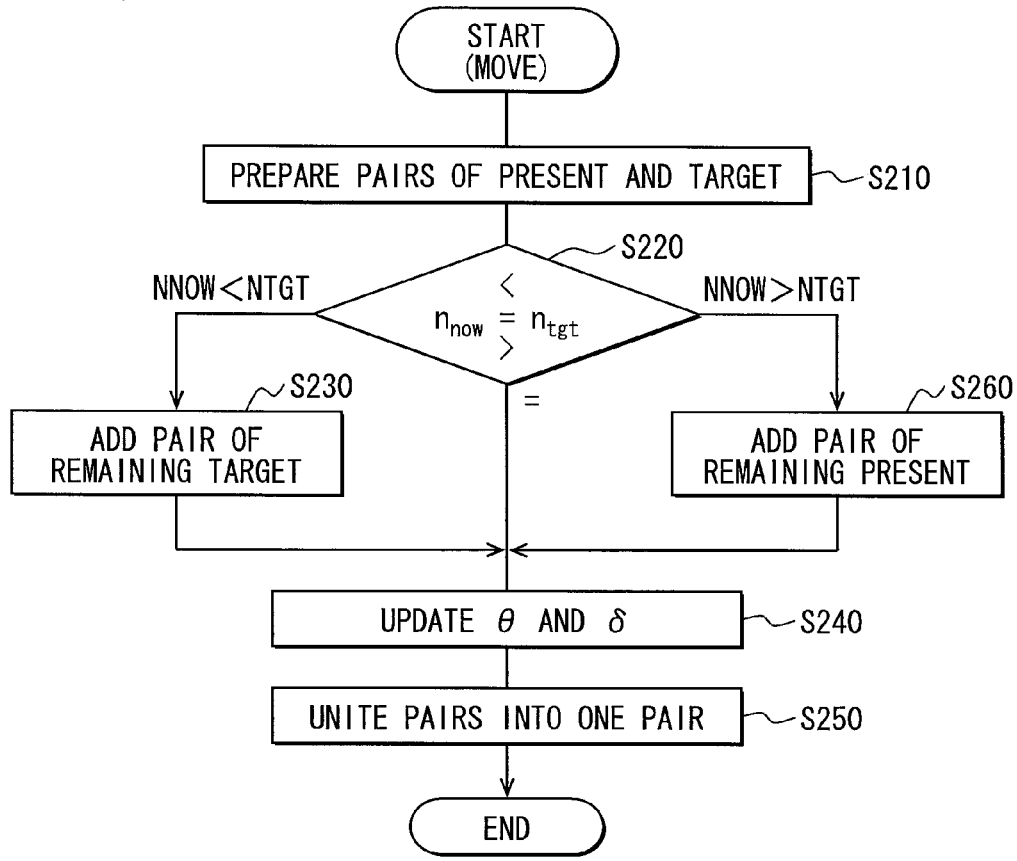
FIG. 5 is a flowchart diagram illustrating a smooth movement process for a specified direction in the sound output apparatus.
Figure 6:
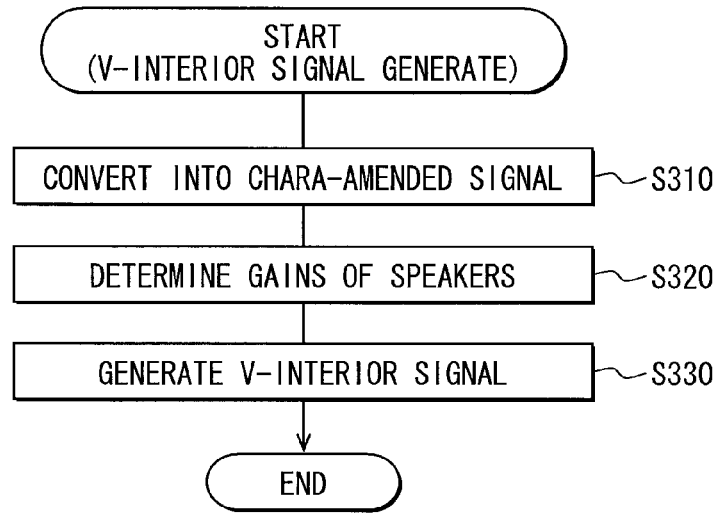
FIG. 6 is a flowchart diagram illustrating a signal generation process for a vehicle-interior output signal in the sound output apparatus.
Figure 8:
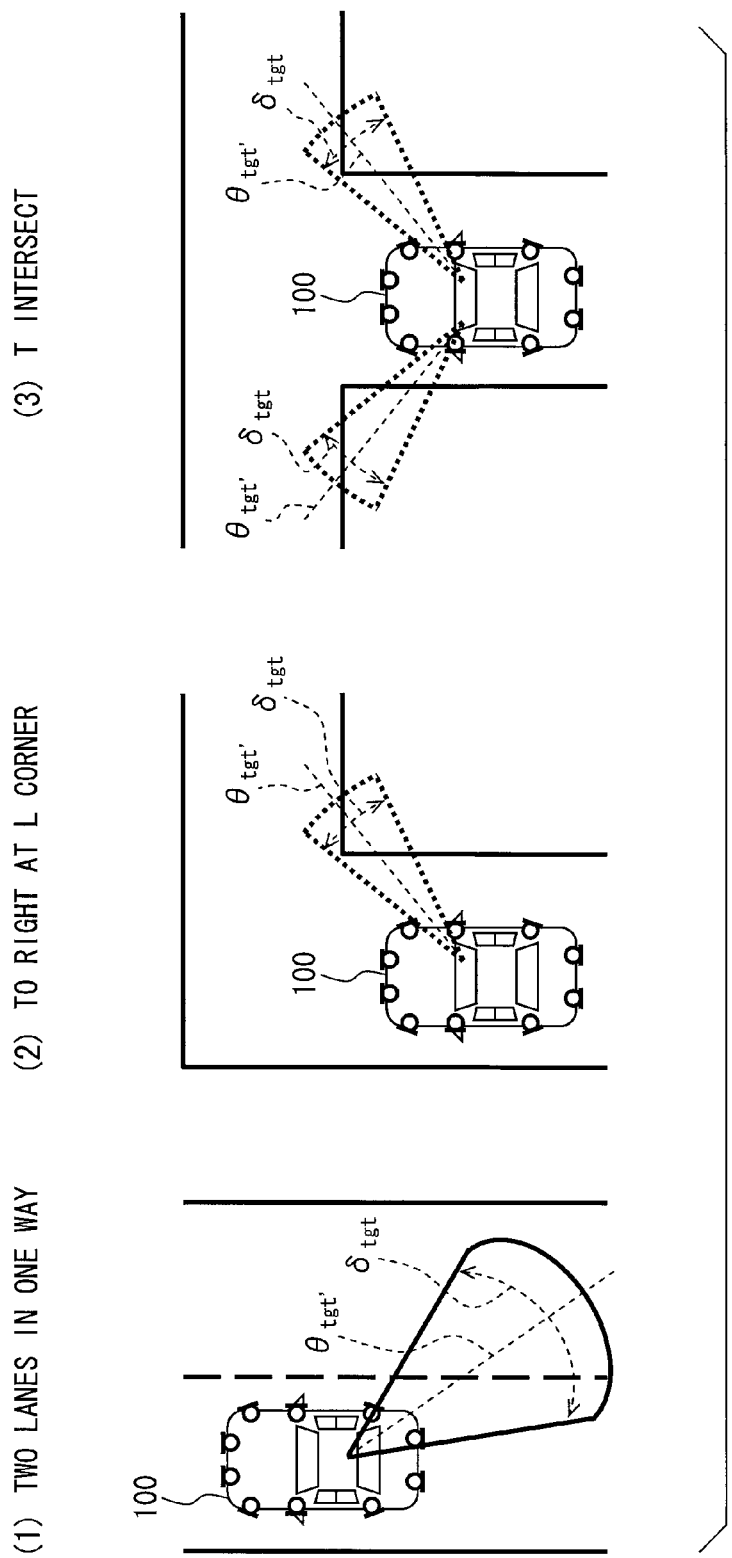
FIG. 8 is a diagram illustrating setup examples of specified directions.
Figure 9:
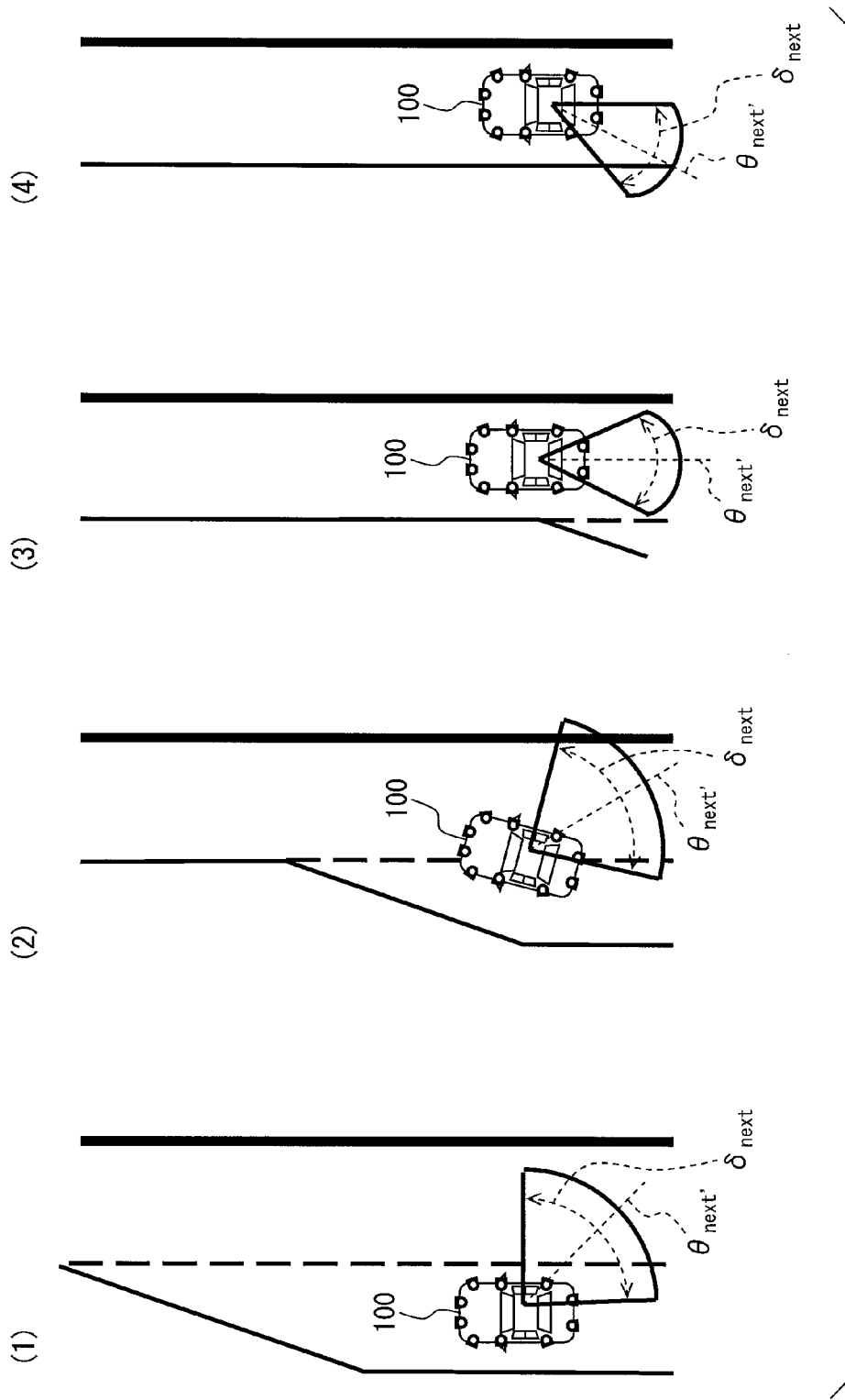
FIG. 9 is a diagram illustrating a smooth movement of a specified direction.
Figure 10:
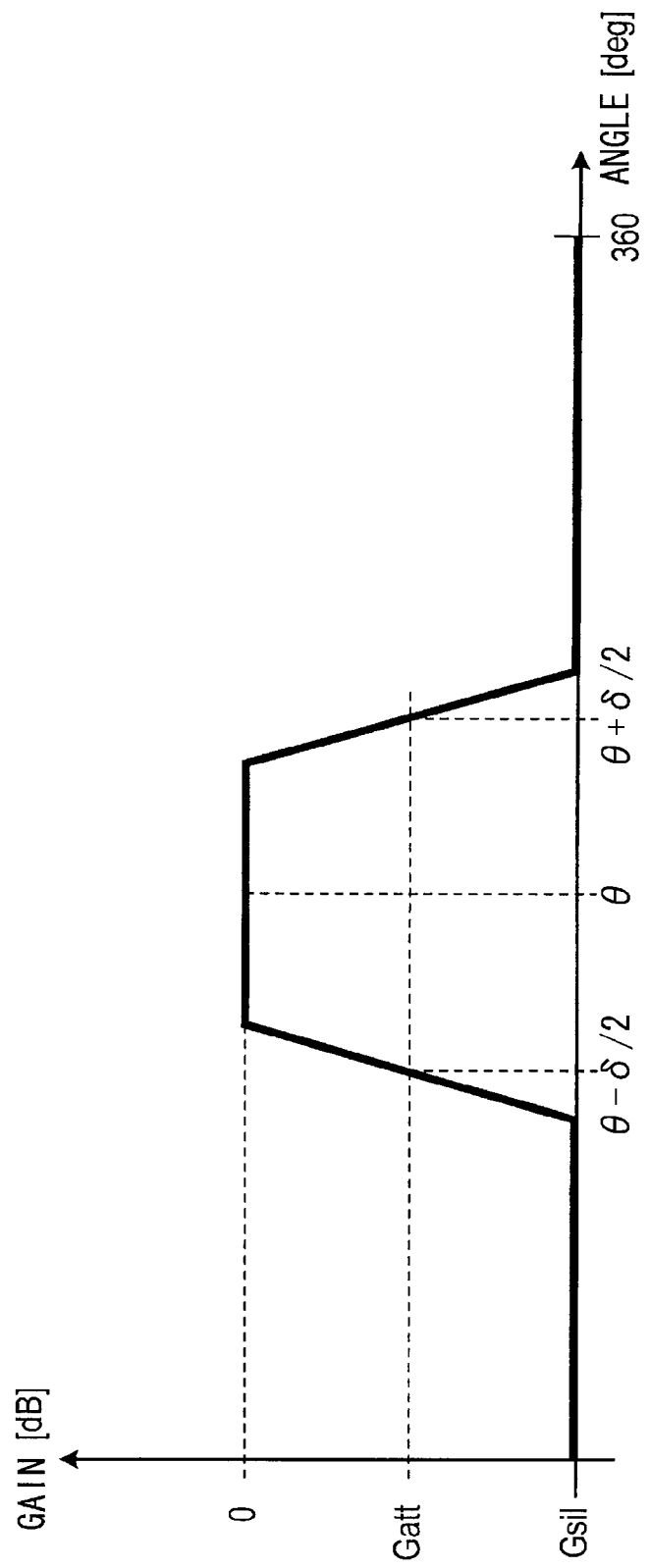
FIG. 10 is a diagram for explaining a reproduction gain calculation function.
Figure 11:
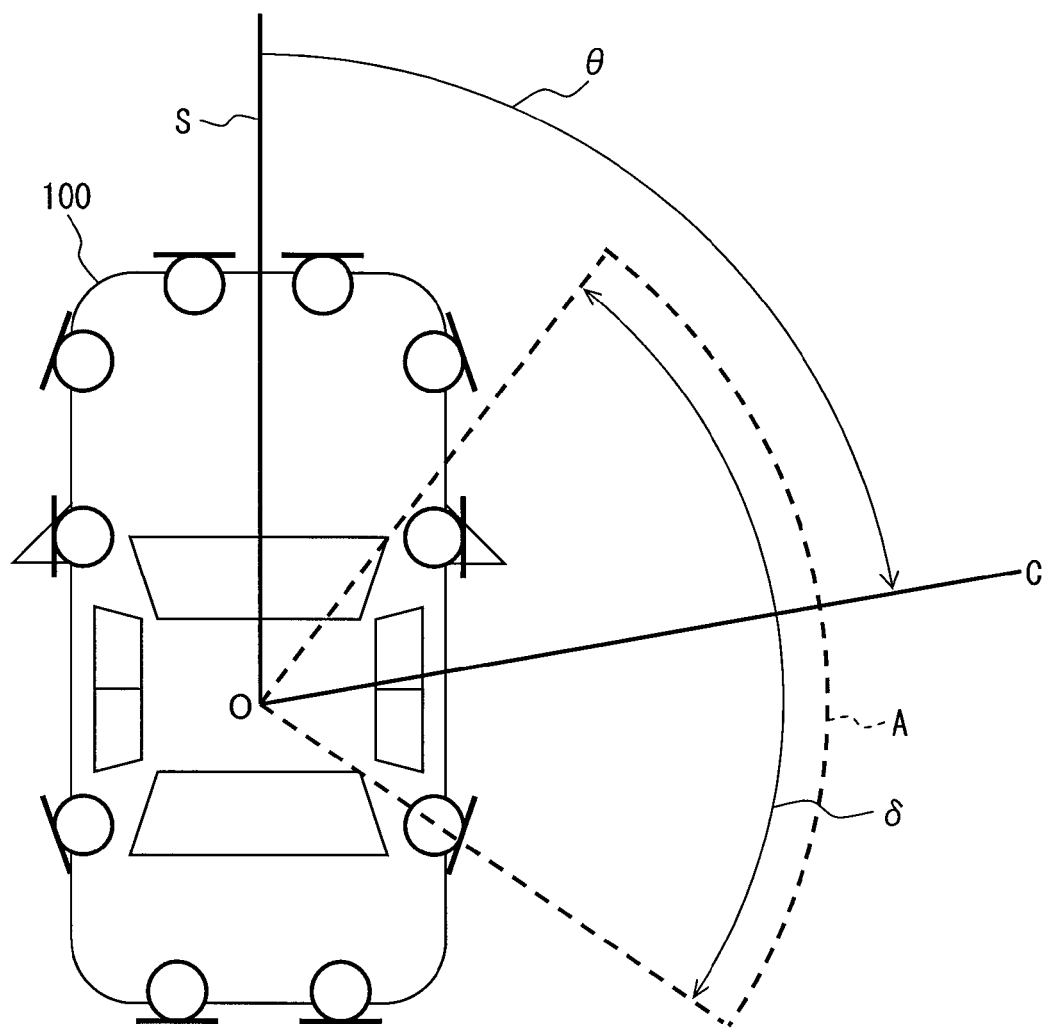
FIG. 11 is a diagram for explaining a specified direction having a central angle and a width angle.
Figure 12:
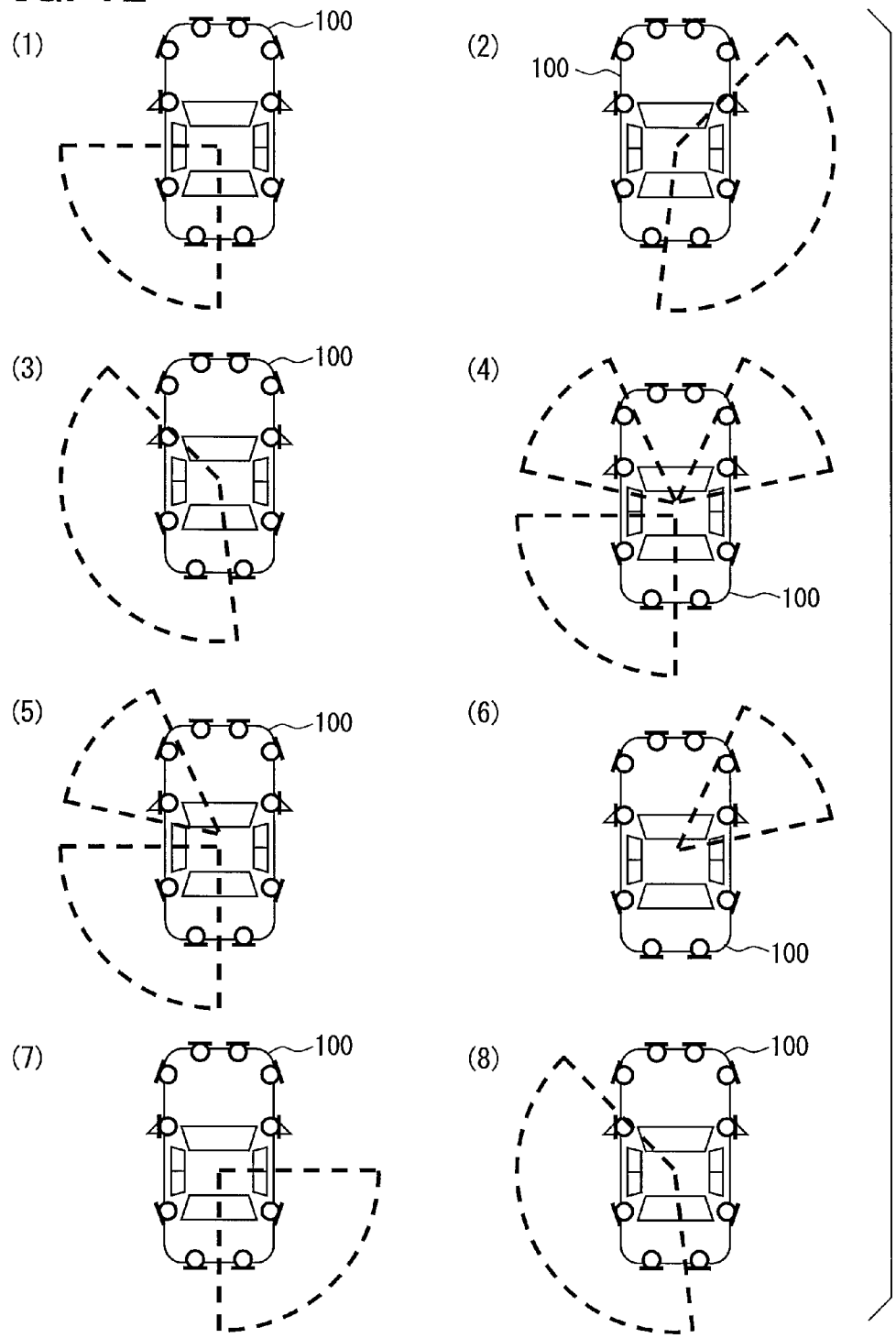
FIG. 12 is a diagram for explaining examples of images displayed in a display.

The diagrams referred to herein include the following. FIG. 3 is a flowchart diagram illustrating an overall process in the sound output apparatus 1. FIG. 4 is a flowchart diagram illustrating an update process of updating a specified direction in the sound output apparatus 1. FIG. 5 is a flowchart diagram illustrating a smooth movement process for a specified direction in the sound output apparatus 1. FIG. 6 is a flowchart diagram illustrating a signal generation process for a vehicle-interior output signal in the sound output apparatus 1. FIG. 7 is a diagram illustrating a setup table of specified directions. FIG. 8 is a diagram illustrating setup examples of specified directions. FIG. 9 is a diagram illustrating a smooth movement of a specified direction. FIG. 10 is a diagram illustrating a reproduction gain calculation function. FIG. 11 is a diagram for explaining a specified direction. FIG. 12 is a diagram for explaining examples of images displayed in the display 19.

It is noted that a specified direction A may be defined as follows. As indicated in FIG. 11, when the vehicle 100 is viewed from the top to the bottom, an origin O may be defined at a predetermined point in the vehicle 100 whereas a line starting from the origin O along a forward or heading direction of the vehicle 100 is defined as a reference line S. With reference to FIG. 11, a specified direction A is defined as an angle range between (θ−δ/2) and the angle of (θ+δ/2) with the origin O centered and a central line C serving as a median line. Herein, θ is referred to as a central angle θ and defined as an angle from the reference line S to the central line C; δ is referred to as a width angle δ and defined as an angle which the central line S halves. In other words, the specified direction A has (i) a direction expressed by the central line C or the central angle θ and (ii) a width expressed by the width angle δ.

At S10 in FIG. 3, it is determined whether specified directions A are updated at S40, which will be later mentioned, within past T msec (T is a predetermined positive number). When it is determined that the specified directions A are not updated within past T msec, the processing proceeds to S20; when it is determined that the specified directions A are updated, the processing proceeds to S50. It is noted that the number of specified directions A may not be limited to more than one, and may be a single.

At S20, the position of the vehicle 100 is acquired by the GPS receiver 9. At S30, the road information of a proximity of the position of the vehicle 100 acquired by the GPS receiver 9, in particular, road information of the heading direction of the vehicle 100, is acquired from the road database in the road-information storage device 21.

At S40, the central angles θ and the width angles δ of the specified directions A are updated by the specified-direction determination section 13. This update process will be explained with reference to flowcharts in FIGS. 4, 5.

At S110 in FIG. 4, the present setup information of the central angles θ and the width angles δ of the specified directions A are acquired; the present setup information has been set up just previously. The present setup information includes (i) the number Nnow of specified directions Anow and (ii) the central angle θnow and the width angle δnow of each of the specified directions Anow.

At S120, the target setup information of the central angles θtgt and the width angles δtgt of the target specified directions Atgt are acquired. Specifically, the central angles θ and the width angles δ previously associated with the road information acquired at S30 are acquired with reference to the specified-direction setup reference database 15, and designated as the central angles θtgt and the width angles δtgt of the target specified directions Atgt.

With reference to FIG. 7, the specified-direction setup reference database 15 stores the road information including the shapes of roads ahead of the vehicle 100, the number of lanes of the roads, and the information on traveling lane (which lane the vehicle 100 runs at the time) while storing the target setup information associated with the road information. Thus, the target setup information associated with the road information acquired at S30 is acquired from the specified-direction setup reference database 15. The correspondence relation between the road information and the target setup information may be also as indicated in FIGS. 8 (1)-(3), alternatively.

With reference to FIG. 12, the image generation section 17 prepares images corresponding to the target setup information, and displays the images in the display 19. The images displayed are top view images of the vehicle 100 including the target central angles θtgt of the central lines C and the target width angles δtgt of the target specified directions Atgt. The images of (1)-(8) in FIG. 12 are equivalent to the target setup information (1) to (8) in FIG. 7, respectively.

At S130, the central angles θ of the central lines C and the width angles δ of the specified directions A are moved smoothly from the present setup information into the target setup information. This process will be explained with reference to a flowchart in FIG. 5. At S210 in FIG. 5, pairs are made with one present specified-direction Anow and one target specified-direction Atgt. The number of present specified directions Anow is referred to as Nnow; the number of target specified directions Atgt is referred to as Ntgt. When Nnow>Ntgt or Nnow=Ntgt, the pairs are prepared to prevent a target specified direction Atgt from remaining without being paired with a present specified direction Anow. When Nnow<Ntgt, the pairs are prepared to prevent a present specified direction Anow from remaining without being paired with a target specified direction Atgt. In addition, a pair between the present specified direction Anow and the target specified direction Atgt is prepared such that an angle between (i) the central line C of the present specified direction Anow and (ii) the central line C of the target specified direction Atgt is smallest (refer to FIG. 11).

At S220, Nnow and Ntgt is compared. When Ntgt is greater than Nnow, the processing proceeds to S230. When Ntgt is equal to Nnow, the processing proceeds to S240. When Nnow is greater than Ntgt, the processing proceeds to S260.

At S230, a remaining target specified direction Atgt and an auxiliary present specified direction Anow are designated to form an additional pair. The remaining target specified direction Atgt is remaining without being paired with any present specified direction Anow. The auxiliary present specified direction Anow is one of those already paired with other target specified directions Atgt; the central line C of the auxiliary present specified direction Anow forms the smallest angle with the central line C of the remaining target specified direction Atgt. At S260, a remaining present specified direction Anow and an auxiliary target specified direction Atgt are designated to form an additional pair. The remaining present specified direction Anow is remaining without being paired with any target specified direction Atgt. The auxiliary target specified direction Atgt is one of those already paired with other present specified directions Anow; the central line C of the auxiliary target specified direction Atg forms the smallest angle with the central line C of the remaining present specified direction Anow.

At S240, an after-update specified directions Anext (which may be also referred to as a next specified directions Anext) having central angles θnext and width angles δnext, which are obtained after update, are prepared using Expression A.

θdiff(i)=min(|θnow(i)−θtgt(i)|,θth). When
    θnow(i)>θtgt(i), θnext(i)=θnow(i)−θdiff(i); when
    θnow(i)<=θtgt(i), θnext(i)=θnow(i)+θdiff(i).

δdiff(i)=min(|δnow(i)−δtgt(i)|,δth). When
    δnow(i)>δtgt(i), δnext(i)=δnow(i)−δdiff(i); when
    δnow(i)<=δtgt(i), δnext(i)=δnow(i)+δdiff(i).          [Expression A]

Herein, θth and δth are predetermined.

At S250, if multiple after-update specified directions Anext are existing and part of them have values close to each other, such part are unified into one after-update specified direction Anext.

The above process provides the after-update specified direction(s) Anext having the central angle(s) θnext and width angle(s) δnext. Examples 1, 2 of S130 will be explained.

Example 1

Road information ahead of the vehicle 100: The vehicle is traveling a straight road having one lane in one traffic way and approaching a crisscross intersection ahead.

The present setup information corresponding to a straight road having one lane in one way: Specified direction Anow having central angle θnow of 225 degrees and width angle δnow of 90 degrees. The specified direction is presented by (θnow, δnow)=(225, 90), for instance. Target setup information: (θtgt, δtgt)=(45, 45), (225, 90), (335, 45).

At S210 in Example 1, (θnow, δnow)=(225, 90) is paired with (θtgt, δtgt) (225, 90). This pair is presented by <θnow, θtgt>=<225, 225>. In contrast, (θtgt, δtgt)=(45, 45), (335, 45) are not paired with any present specified direction Anow at S210.

At S230, (θnow, δnow)=(225, 90) is used for overcoming the lack of pairs. That is, three pairs are prepared as follows.

$$<\theta now(1), \theta tgt(1)>=<225,225>$$

$$<\theta now(2), \theta tgt(2)>=<225,45>$$

$$<\theta now(3), \theta tgt(3)>=<225,335>$$

The three pairs are attached with (1) to (3) to differentiate from each other.

At S240, S250, the following Expression 1 is executed. At this time, a pair having similar central angle and width angle does not exist; thus, any pairs are not united.

[Expression 1]

θdiff(1)=0 provides θnext(1)=225 while δdiff(1)=0 provides δnext(1)=90.    [i=1]

θdiff(2)=30, and δnow(2)>δtgt(2) provide
θnext(2)=225−30=195 while δdiff(2)=30, and
δnow(2)>δtgt(2) provide δnex(2)=90−30=60.    [i=2]

θdiff(3)=30, and θnow(3)<=θtgt(3) provide
θnext(3)=225+30=255 while Eδdiff(3)=30, and
δnow(3)>δtgt(3) provide δnex(3)=90−30=60.    [i=3]

As a result, the following three after-update specified directions Anext are obtained: (θnext, δnext)=(225, 90), (195, 60), (255, 60).

Example 2

Road information ahead of the vehicle 100: The vehicle is going to travel a straight road across a crisscross intersection on a road having one lane in one traffic way.

The present setup information corresponding to straight road having one lane in one traffic way: (θnow, δnow)=(135, 90), (225, 90), (245, 90). Target setup information: (θtgt, δtgt)=(225, 90).

At S210 in Example 2, (θnow, δnow)=(225, 90) is paired with (θtgt, δtgt) (225, 90) to form a pair of <θnow, θtgt>=<225, 225>. In contrast, (θnow, δnow)=(135, 90), (245, 90) are not paired with any target specified direction Atgt at S210.

At S260, (θtgt, δtgt)=(225, 90) is used for overcoming the lack of pairs. That is, three pairs are prepared as follows.

$$<\theta now(1), \theta tgt(1)>=<225,225>$$

$$<\theta now(2), \theta tgt(2)>=<135,225>$$

$$<\theta now(3), \theta tgt(3)>=<245,225>$$

The three pairs are attached with (1) to (3) to differentiate from each other.

At S240, S250, the following Expression 2 is executed. The pairs (1), (3) have similar central angles and similar width angles; thus, the pairs are united into one.

[Expression 2]

θdiff(1)=0 provides θnext(1)=225 while δdiff(1)=0 provides δnex(1)=90.    [i=1]

θdiff(2)=30, and θnow(2)<=θtgt(2) provide
θnext(2)=135+30=165 while δdiff(2)=0, and
δnow(2)<=δtgt(2) provide δnext(2)=90.    [i=2]

θdiff(3)=20, and θnow(3)>δtgt(3) provide
θnext(3)=245−20=225 while δdiff(3)=0, and
δnow(3)<=δagt(3) provide δnext(3)=90.    [i=3]

The above provides the following two results of central angles θnext and width angles δnext: (θnext, δnext)=(225, 90), (165, 90).

Returning to the flowchart in FIG. 3, at S50, vehicle-interior output signals are generated. This process will be explained with reference to the flowchart in FIG. 6.

At S310 in FIG. 6, input signals of the vehicle-exterior microphone device 3 are converted into characteristic-amended signals. This process is a known technology to previously determine a transfer function, which cancels changes of frequency characteristics generated in the input system, to apply to filtering. In addition, the above process applied to each of the vehicle-exterior microphones 3a to 3j. Therefore, the characteristic-amended signals exist for the vehicle-exterior microphones 3a to 3j, respectively.

At S320, reproduction gains of the vehicle-interior speakers 7a to 7j are determined from (i) the central angles θnext and width angles δnext of the after-update specified directions Anext and (ii) the angles of the vehicle-interior speakers 7a to 7j. The following will explain in detail. With reference to FIG. 10, a reproduction gain calculation function is determined. In FIG. 10, the lateral axis presents an angle that increases clockwise from the reference line S (see FIG. 11) serving as zero degree; the longitudinal axis presents a gain. The reproduction gain calculation function provides a large gain around the central angle θnext, and a small gain at the other angles. An inclination around each of (θnext−δnext/2) and (θnext+δnext/2) in the reproduction gain calculation function is assigned with a predetermined value. The installation angles of the vehicle-interior speakers 7a to 7j, which are angles provided to ascend clockwise from 0 degree of the reference line S (refer to FIG. 11), are inputted into the reproduction gain calculation function, thereby determining the reproduction gains of the vehicle-interior speakers 7a to 7j, respectively.

At S330, the characteristic-amended signals of the vehicle-exterior microphones 3a to 3j obtained at S310 are multiplied, respectively, by the reproduction gains determined at S320, thereby obtaining vehicle-interior output signals of the respective vehicle-interior speakers 7a-7j. The following will explain in detail. the characteristic-amended signal of the vehicle-exterior microphone 3a, which collects sounds that is to be outputted by the vehicle-interior speaker 7a, is multiplied by the reproduction gain of the vehicle-interior speaker 7a, thereby obtaining a vehicle-interior output signal of the vehicle-interior speaker 7a. Similarly, vehicle-interior output signals are prepared for other vehicle-interior speakers 7b to 7j, respectively.

Returning to the flowchart in FIG. 3, the vehicle-interior speakers 7a to 7j reproduce the vehicle-interior output signals and output sounds, respectively.

3. Effect by Sound Output Apparatus 1

(1) The sound output apparatus 1 increases the gains of vehicle-interior speakers installed within the range of the specified direction Anext among the vehicle-interior speakers 7a to 7j. Therefore, the sounds outputted by the vehicle-interior speakers 7a to 7j can be heard by the driver from the specified direction Anext; namely, the direction of the sound image localization turns into the specified direction Anext. This permits the driver to pay attention to the specified direction Anext to which the driver needs to pay attention essentially. In addition, the driver understands and learns the direction at which cautions should be directed; this may apply to the subsequent driving of the driver.

(2) The specified direction Anext has a width angle δnext; the width angle δnext differs depending on road information. Therefore, the suitable width angle δnext can be designated depending on the state of the road.

(3) The sound output apparatus 1 outputs, with emphasis, subject sounds, which are collected by subject vehicle-exterior microphone(s) within the range of the specified direction Anext among all the vehicle-exterior microphones 3a to 3j, compared with other sounds which are collected by other vehicle-exterior microphones other than the subject vehicle-exterior microphone(s). Therefore, the caution of the driver can be directed to the sound announced from the specified direction Anext, which is a direction to which the driver needs to pay attention essentially.

(4) The sound output apparatus 1 determines the central angle θnext and the width angle δnext of the after-update specified direction Anext from (i) the central angle θnow and width angle δnow of the present specified direction Anow that is determined just previously, and (ii) the central angle θtgt and width angle δtgt of the target specified direction Atgt. Therefore, the movement or change to the central angle θnext and width angle δnext of the after-update specified direction Anext can be made smoothly, making the driver understand easily.

For example, when the vehicle 100 enters a road having one lane with a median strip, the peripheral road state changes every moment. In response to the change of the peripheral road state, the central angle θnext and width angle δnext of the specified direction Anext can move or change smoothly, as indicated in FIGS. 9 (1)-(4).

(5) The sound output apparatus 1 can display images corresponding to the target setup information with the image generation section 17 and the display 19. This permits the driver to understand the target setup information easily.

Modification

The present disclosure is not limited to the above mentioned embodiment at all. It can be achieved in various manners within a scope not departing from the present disclosure. For example, the sound output apparatus 1 may make the gain of a subject microphone among all the vehicle-exterior microphones 3a to 3j directed at a specified direction A higher than the gains of other microphones. Even in this configuration, the sound outputted by the vehicle-interior speakers 7a to 7j may permit the driver to hear from the specified direction Anext, which is the direction of the sound image localization.

Figure 13:
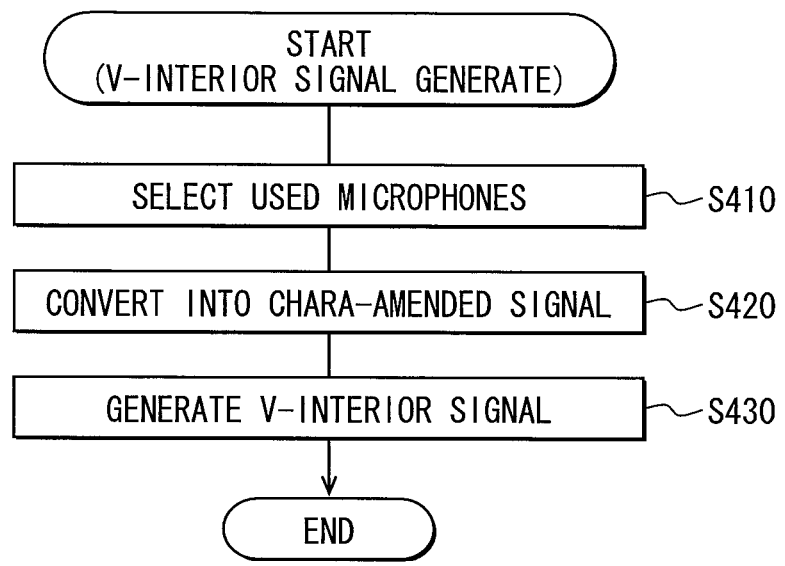
FIG. 13 is a flowchart diagram illustrating another signal generation process for a vehicle-interior output signal in the sound output apparatus according to a modification of the first embodiment.

Thus, the vehicle-interior output signal generation process may be achieved using a flowchart in FIG. 13 by replacing the flowchart in FIG. 6. At S410 in FIG. 13, among all the vehicle-exterior microphones 3a to 3j, a subject microphone, which is within the range of the specified direction Anext, is selected as a used microphone; in contrast, input signals of other microphones other than the subject microphone is set to 0.

At S420, a microphone input signal of the used microphone is converted into a characteristic-amended signal. The characteristic-amended signal is made into a vehicle-interior output signal at S430.

Figure 14:
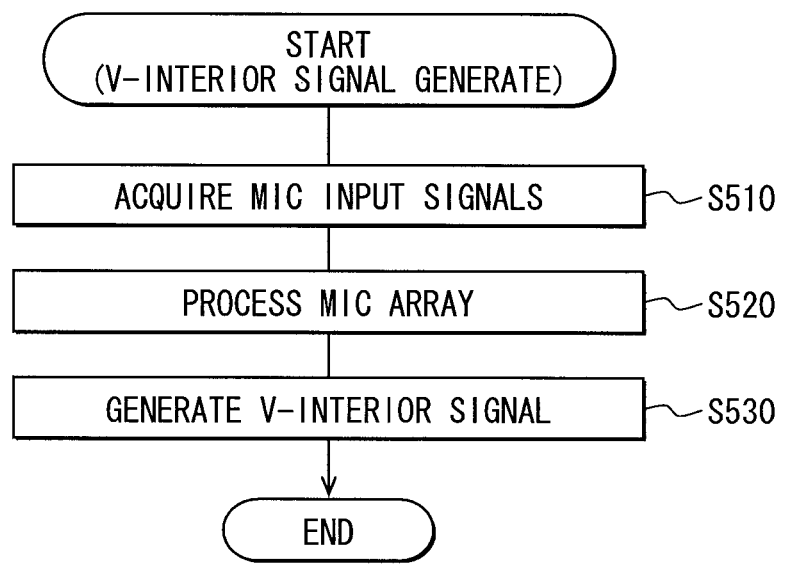
FIG. 14 is a flowchart diagram illustrating yet another signal generation process for a vehicle-interior output signal in the sound output apparatus according to another modification.

In addition, the signal generation process of the vehicle-interior output signal may be achieved using a flowchart in FIG. 14. At S510 in FIG. 14, microphone input signals are obtained from all the vehicle-exterior microphones 3a to 3j.

At S520, a microphone array process is executed based on the central angle θ and width angle δ of the specified direction A, thereby providing sound signals to reproduce. This process forms a beam form directed toward the specified direction A having the central angle θ and width angle δ using a well-known array signal processing technology, and applies it to microphone input signals.

At S530, a wave front reproduction process is executed based on the central angle θ and width angle δ of the specified direction A and the positions of the speakers 7a to 7j, thereby providing vehicle-interior output signals to be outputted by the speakers 7a to 7j. This process uses a known wave front reproduction process such as a vector base amplitude panning or wave field synthesis and, thereby, provides characteristic-amended signals so as to reproduce a wave front having the central angle θ and width angle δ of the specified direction A. It is noted that the distance to the sound image reproduced may be assigned with a predetermined value.

In addition, the sound output apparatus 1 may further include an opening point detection sensor 23 (also referred to as an opening point detection device or means) which detects an opening point (e.g., an opening point of a side window) of the vehicle 100. In this case, the vehicle-interior output signal generation section 5 may function as an opening point sound reduction section, device, or means 5. The opening point sound reduction section reduces a gain of the direction directed at the opening point, in the gain calculation function in FIG. 10, as compared with other directions. This may reduce, among volumes of sounds collected from outside of the vehicle, a volume of a sound collected from the direction directed at the opening point, compared with other volumes of sounds collected from other directions.

In addition, the sound output apparatus 1 may further include a travel speed sensor 24 (also referred to as a travel speed acquisition device or means) which acquires a travel speed of the vehicle 100. This configuration may permit the determination of the central angle θtgt and width angle θtgt of the target specified direction Atgt in response to the travel speed as well as the road information. Thus, the central angle θtgt and width angle θtgt of the target specified direction Atgt may be set up suitably.

In addition, the sound output apparatus 1 may further include a camera 22 (also referred to as an image acquisition device or means) which acquires an image of the heading direction of the vehicle 100. Such an image acquired may permit recognition of white lines (i.e., lane markers), traffic signs, etc. using a known image analysis technology; the recognition result may provide road information.

Aspects of the disclosure described herein are set out in the following clauses.

As a first aspect of the disclosure, a sound output apparatus for a vehicle is provided to include a sound input device, a sound signal generation section, a sound output device, a road-information acquisition section, and a specified-direction determination section. The sound input device collects sounds outside of the vehicle. The sound signal generation section generates an output signal based on the sounds outside of the vehicle collected by the sound input device. The sound output device outputs a sound to a vehicle interior of the vehicle based on the output signal generated by the sound signal generation section. The road-information acquisition section acquires road information in proximity of the vehicle. The specified-direction determination section determines a specified direction which is previously associated with the road information. The sound signal generation section generates the output signal such that a direction of sound-image localization of a sound outputted by the sound output device accords with the specified direction determined by the specified-direction determination section.

According to a second aspect being optional, the specified direction may have a width that is previously associated with the road information.

The width may be designated suitably depending on the state of the road. In addition, the specified direction may have a constant width.

According to a third aspect being optional, an emphasis section may be further included to permit the sound output device to emphasize, of the sounds outside of the vehicle collected by the sound input device, a sound outside of the vehicle in the specified direction over sounds outside of the vehicle in other directions.

Therefore, the caution of the user or driver can be directed to the sound announced from the specified direction, which is a direction to which the user or driver needs to pay attention essentially.

According to a fourth aspect being optional, the sound output device may include a plurality of sound output elements, which output sounds based on sounds outside of the vehicle in different directions, respectively. The emphasis section may make a gain of a subject sound output element of the plurality of sound output elements greater than gains of other sound output elements of the plurality of sound output elements other than the subject sound output element. The subject sound output element outputs a sound to the vehicle interior based on a sound outside of the vehicle collected in the specified direction.

Under such a configuration, of the sounds outside of the vehicle, a subject sound in the specified direction may be outputted with emphasis over other sounds in other directions.

According to a fifth aspect being optional, the sound input device may include a plurality of sound input elements, which collect sounds outside of the vehicle in different directions, respectively. The emphasis section may make a gain of a subject sound input element of the plurality of sound input elements greater than gains of other sound input elements of the plurality of sound input elements other than the subject sound input element. The subject sound input element collects a sound outside of the vehicle in the specified direction.

Similarly to fourth aspect, of the sounds outside of the vehicle, a subject sound in the specified direction may be outputted with emphasis over other sounds in other directions.

According to a sixth aspect being optional, an opening detection device may be further included to detect, of the vehicle, an opening point opening from the vehicle interior toward an exterior of the vehicle. Further, an opening sound reduction section may be included to permit the sound output device to make a volume of a sound, which is collected outside of the vehicle in a subject direction, smaller than volumes of sounds collected outside of the vehicle in directions other than the subject direction. The subject direction is directed at the opening point detected by the opening detection device.

This may reduce, among volumes of sounds collected outside of the vehicle, the volume of a subject sound collected from the direction directed at the opening point, compared with the volumes of other sounds collected from other directions.

According to a seventh aspect being optional, the road information may include at least one of a branch state of roads, a number of lanes, presence or absence of a merging lane, presence or absence of a crosswalk, presence or absence of a stop sign, presence or absence of a side walk, presence or absence of a median strip, presence or absence of a traffic signal, presence or absence of a railway, residential area or not, speed limit information, and road sign information.

According to an eighth aspect being optional, the specified-direction determination section may determine the specified direction depending on a specified direction just previously determined.

This configuration may permit a smooth movement or change of the specified direction.

According to a ninth aspect being optional, a travel speed acquisition device may be further included to acquire a travel speed of the vehicle. The specified-direction determination section may determine the specified direction depending on the travel speed acquired.

This configuration may achieve a suitable setup of the specified direction.

According to a tenth aspect being optional, a vehicle position acquisition device may be further included to acquire a vehicle position of the vehicle. Further, a road-information storage device may be included to store road information. The road-information acquisition section may acquire road information around the vehicle position acquired from the road-information storage device.

This configuration may permit easier acquisition of more accurate road information.

According to an eleventh aspect being optional, an image acquisition device may be further included to acquire an image in a heading direction of the vehicle. The road-information acquisition section may acquire the road information from the image acquired.

This configuration may omit the road-information storage device.

According to a twelfth aspect being optional, a display device may be further included to be provided in the vehicle interior of the vehicle to display the specified direction.

This configuration may permit the user to understand the specified direction easily.

According to a thirteenth aspect being optional, a specified-direction setup storage device may be further included to store (i) road information and (ii) setup information of specified directions that are associated with the road information. The specified-direction determination section may determine the specified direction by referencing the specified-direction setup storage device based on the road information acquired by the road-information acquisition section.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A sound output apparatus for a vehicle, the sound output apparatus comprising:
   a sound input device that collects sounds outside of the vehicle;
   a sound signal generation section that generates an output signal based on the sounds outside of the vehicle collected by the sound input device;
   a sound output device that outputs a sound to a vehicle interior of the vehicle based on the output signal generated by the sound signal generation section;
   a road-information acquisition section that acquires road information in proximity of the vehicle; and
   a specified-direction determination section that determines a specified direction previously associated with the road information,
   wherein:
   the sound signal generation section generates the output signal causing the sound output device to output a sound in a direction of sound-image localization in accordance with the specified direction determined by the specified-direction determination section.

2. The sound output apparatus according to claim 1, wherein:
   the specified direction has a width that is previously associated with the road information.

3. The sound output apparatus according to claim 1, further comprising:
   an emphasis section that permits the sound output device to emphasize, of the sounds outside of the vehicle collected by the sound input device, a sound outside of the vehicle in the specified direction over sounds outside of the vehicle in other directions.

4. The sound output apparatus according to claim 3, wherein:
   the sound output device includes a plurality of sound output elements, which output sounds based on sounds outside of the vehicle in different directions, respectively; and
   the emphasis section makes a gain of a subject sound output element greater than gains of other sound output elements,
      the subject sound output element being of the plurality of sound output elements,
      the subject sound output element outputting a sound to the vehicle interior based on a sound outside of the vehicle collected in the specified direction,
      the other sound output elements being of the plurality of sound output elements excluding the subject sound output element.

5. The sound output apparatus according to claim 3, wherein:
   the sound input device includes a plurality of sound input elements, which collect sounds outside of the vehicle in different directions, respectively; and
   the emphasis section makes a gain of a subject sound input element greater than gains of other sound input elements,
      the subject sound input element being of the plurality of sound input elements,
      the subject sound input element collecting a sound outside of the vehicle in the specified direction,
      the other sound input elements being of the plurality of sound input elements excluding the subject sound input element.

6. The sound output apparatus according to claim 1, further comprising:
   an opening detection device that detects, of the vehicle, an opening point opening from the vehicle interior toward an exterior of the vehicle; and
   an opening sound reduction section that permits the sound output device to make a volume of a sound, which is collected outside of the vehicle in a subject direction, smaller than volumes of sounds collected outside of the vehicle in directions excluding the subject direction, the subject direction being directed at the opening point detected by the opening detection device.

7. The sound output apparatus according to claim 1, wherein:
   the road information includes at least one of a branch state of roads, a number of lanes, presence or absence of a merging lane, presence or absence of a crosswalk, presence or absence of a stop sign, presence or absence of a side walk, presence or absence of a median strip, presence or absence of a traffic signal, presence or absence of a railway, residential area or not, speed limit information, and road sign information.

8. The sound output apparatus according to claim 1, wherein:
   the specified-direction determination section determines the specified direction depending on a specified direction just previously determined.

9. The sound output apparatus according to claim 1, further comprising:
   a travel speed acquisition device that acquires a travel speed of the vehicle,
   wherein:
   the specified-direction determination section determines the specified direction depending on the travel speed acquired.

10. The sound output apparatus according to claim 1, further comprising:
    a vehicle position acquisition device that acquires a vehicle position of the vehicle; and
    a road-information storage device that stores road information,
    wherein:
    the road-information acquisition section acquires road information around the vehicle position acquired from the road-information storage device.

11. The sound output apparatus according to claim 1, further comprising:
    an image acquisition device that acquires an image in a heading direction of the vehicle,
    wherein:
    the road-information acquisition section acquires the road information from the image acquired.

12. The sound output apparatus according to claim 1, further comprising:
    a display device provided in the vehicle interior of the vehicle to display the specified direction.

13. The sound output apparatus according to claim 1, further comprising:
    a specified-direction setup storage device that stores (i) road information and (ii) setup information of specified directions that are associated with the road information,
    wherein:
    the specified-direction determination section determines the specified direction by referencing the specified-direction setup storage device based on the road information acquired by the road-information acquisition section.

* * * * *